Feb. 13, 1962 K. D. ELWICK 3,020,883
ANIMAL INSECTICIDE APPLICATOR
Filed Oct. 26, 1959 2 Sheets-Sheet 1

INVENTOR.
KEITH D. ELWICK
BY William A. Murray
ATTORNEY

Feb. 13, 1962 K. D. ELWICK 3,020,883
ANIMAL INSECTICIDE APPLICATOR
Filed Oct. 26, 1959 2 Sheets-Sheet 2
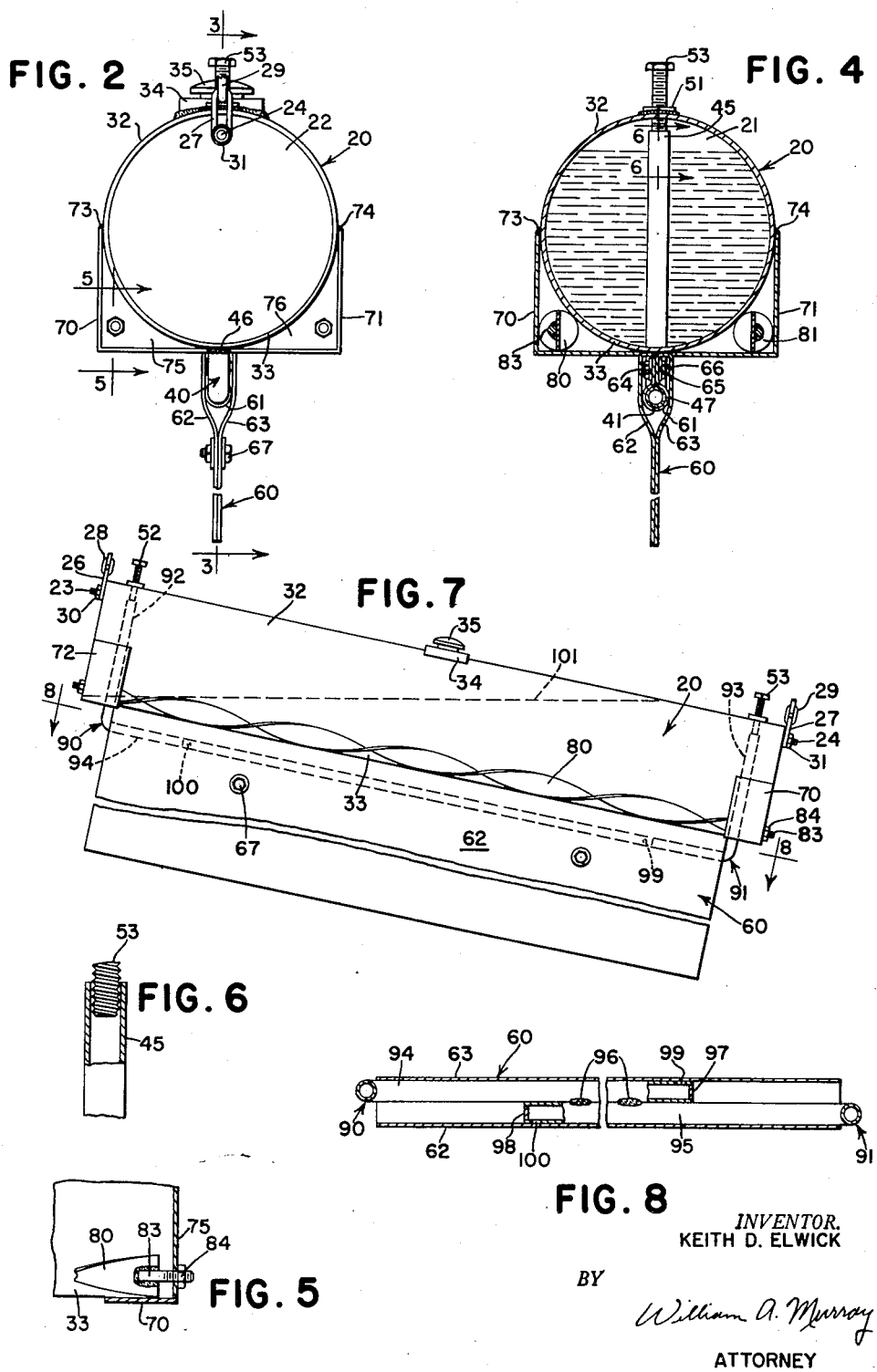
INVENTOR.
KEITH D. ELWICK
BY
William A. Murray
ATTORNEY United States Patent Office 3,020,883
Patented Feb. 13, 1962

3,020,883
ANIMAL INSECTICIDE APPLICATOR
Keith D. Elwick, Vinton, Iowa, assignor to Hawk Bilt Mfg. Corp., Vinton, Iowa, a corporation of Iowa
Filed Oct. 26, 1959, Ser. No. 848,671
12 Claims. (Cl. 119—157)

This invention relates to a device for applying liquid insecticide to the back and sides of an animal. More particularly this invention relates to a device for applying insecticide of the type in which the animal walks under and in contact with a suspended fabric which is penetrated with a liquid insecticide.

Insecticide applying devices of this type are not broadly new. A conventional device now on the market is composed of an elongated horizontally disposed cylinder or liquid insecticide container which has openings in its top surface to permit the fluid to pour out as the cylinder is rolled, such usually occurring by force of the animal as it walks under the device. Surrounding the cylinder is a canvas fabric which becomes permeated with the insecticide. The fabric conventionally has a depending flap which also becomes permeated with insecticide and which contacts the back of the animal.

Generally, the biggest fault with a device of this nature is that often an animal will be attracted by the soothing effect of the insecticide and will by instinct become aware that rolling or turning of the cylinder will cause the fluid to pour out the top openings. Consequently, the animal will stand beneath and operate the device until the container is almost or entirely empty. Also, heavy winds will contact the depending sheet or flap and cause the cylinder to roll sufficiently to cause loss of fluid.

There have, of course, been several valve mechanisms built which will somewhat alleviate the condition. However, the valve mechanisms are generally somewhat expensive and also contain movable parts which due to dirt and the oily substance of the insecticide will often become inoperative.

It is therefore the primary object of the present invention to provide an insecticide applying device of a new and novel design in which the insecticide is sealed within the container and is discharged therefrom by pipes opening into the container which are suitably valved to prevent excessive fluid from passing out of the container. The valves, while manually adjustable, are completely immobile during operation of discharge of the fluid.

It is a further object of the present invention to provide an insecticide applying device of a completely new and radical design which contains no movable parts and yet maintains finite measuring of the fluid insecticide which passes into the depending cloth or fabric. As a result, the device may be cheaply manufactured and maintained and will reduce loss of insecticide fluid except to the back or side of an animal to a minimum.

It is still a further object of the present invention to provide currying elements detachably connected to the device which will in some instances encourage or attract animals to the device.

Other objects and advantages of the invention will become apparent to those skilled in the art as the nature of the invention is better understood from the following disclosure and as shown in the accompanying drawings.

FIGURE 2 is an enlarged end view of the applicator shown in FIGURE 1.

FIGURE 4 is a sectional view taken along the lines 4—4 of FIGURE 3.

FIGURE 5 is an enlarged sectional view taken along the lines 5—5 of FIGURE 2.

FIGURE 6 is an enlarged sectional view taken along the line 6—6 of FIGURE 4.

FIGURE 7 is a front view of a modified form of the invention.

FIGURE 8 is a sectional view, drawn to an enlarged scale, taken substantially along the line 8—8 of FIGURE 7.

Figure 1:
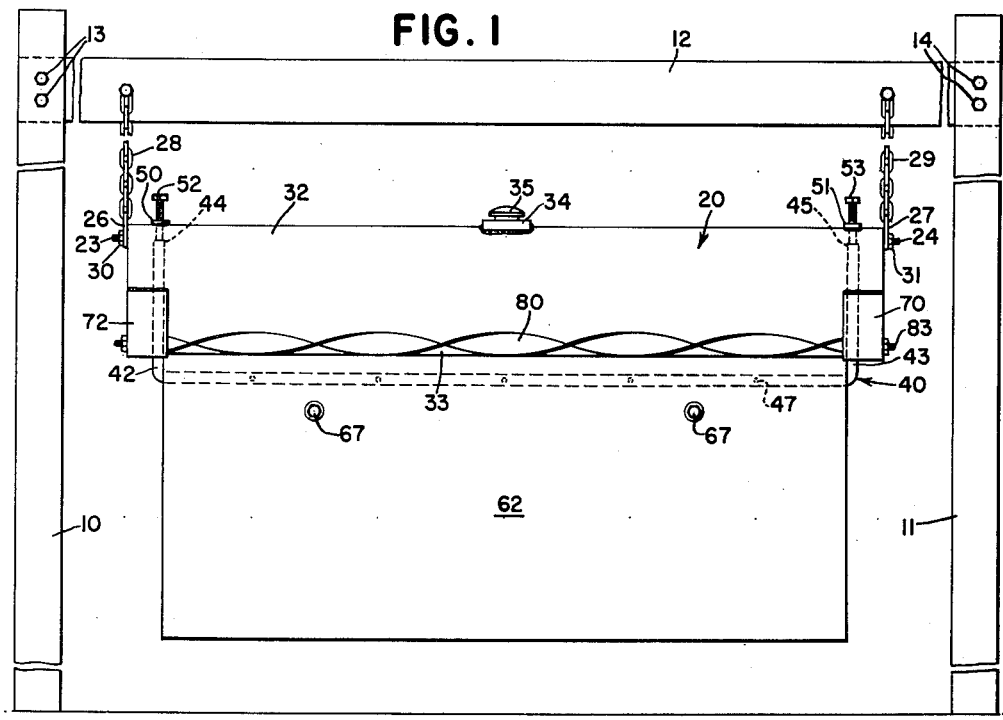
FIGURE 1 is a front view of the animal insecticide applicator incorporating the features of the present invention, portions being broken away where necessary for brevity.

Referring now to FIGURE 1, there is provided a pair of end posts 10, 11 which are pounded or otherwise placed in the ground. Extending between the upper ends of the posts 10, 11 is a cross beam 12 having its opposite ends bolted at 13, 14 to the posts 10, 11. The exact type of posts 10, 11, and the cross beam 12 is of little importance for purpose of this invention. It must, however, be recognized that a main support is required for support of the insecticide applicator presently to be described.

The insecticide applicator is comprised of an elongated cylindrical body 20 disposed horizontally and closed at opposite ends by end walls 21, 22 to form the fluid container for the insecticide. Brackets in the form of bolts 23, 24 extend through the end walls 21, 22 adjacent their upper periphery, the bolt heads being welded, as is shown at 25, to the internal surfaces of the end walls 21, 22. Lower links 26, 27 of flexible or chain supports 28, 29 are fixed against movement relative to the end walls 21, 22 by compressing or locking them against movement on the respective bolts 23, 24 by nuts 30, 31 respectively. Since the lower link is locked against movement, the drum or cylinder 20 is in fact pivoted eccentrically from a point above its upper peripheral surface. Consequently the cylinder 20 will normally rest in a position having a top or overside 32 facing upwardly and a bottom or underside 33 facing downwardly. Also, due to the high point of the pivots relative to the axis of the cylinder 20, it becomes apparent that there will be a strong tendency for the cylinder not to roll or turn about its axis. A fluid inlet or spout 34 having a cap 35 is provided longitudinally midway of the top or overside 32 for purposes of feeding insecticide fluid into the drum or cylinder 20.

A one-piece U-shape pipe or tubing 40 is provided to feed liquid from the cylinder 20. The pipe 40 is composed of a longitudinally extending bight portion 41 parallel and adjacent to and beneath the bottom 33 of the cylinder 30 and extending substantially the length of the cylinder 20, and a pair of oppositely disposed upwardly extending integral leg portions 42, 43 extending through the bottom 33 of the cylinder 20 to upper open ends 44, 45 respectively proximate to but spacedly from the internal surface of the top or overside 32. The leg portions 42, 43 are welded, such as is shown at 46, to the bottom 33 of the cylinder 20 to provide a liquid-tight and rigid joint between the pipe 40 and the cylinder 20. The bight portion 41 is provided with a series of longitudinally spaced liquid discharge means or ports 47. Therefore, unless otherwise restricted, and assuming the liquid may pass through the upper open ends 44, 45 of the pipe 40, the liquid insecticide will flow through the pipe 40 and out the discharge ports 47.

Embossments 50, 51 are welded to the upper surface of the top 32 of the cylinder 20 above the open upper ends 44, 45 of the pipe 40. Tapped openings are provided through the embossments 50, 51 and the adjacent portion of the cylinder top 32 to receive bolts 52, 53, respectively which may extend downwardly into the open ends 44, 45 of the pipe 40. As may be seen in FIGURES 3, 6, the pipe ends 44, 45 are not internally threaded and consequently the bolts 52, 53 will restrict but not completely close off the flow of liquid through the pipe 49. However, by threading the bolts 52, 53 further downward into the ends 44, 45, the restrictive effect will become greater. The bolts 52, 53 thereby operate as valve means for purpose of adjustably restricting the flow of liquid. Also, the engagement of the outer edges of threads on the bolts 52, 53 with the internal surfaces of the pipe ends 44, 45 will create an internal support for those ends from the top 32 of the container.

A fluid permeable material which is conventionally a fluid-transferring median in the form of a canvas sheet 60 is wrapped about the bight portion 41 of the pipe 40 and is permitted to depend therefrom. In the particular form shown, the canvas 60 is wrapped about as at 61 from the underside of the bight portion 46 to encircle the bight portion 41 and has oppositely disposed flaps or folds 62, 63 connected together above the bight portion 41 by means of elongated metal strips 64, 65, which press the flaps together, and bolt and nut means 66 which bolt the strips together. The opposite ends of the flaps 62, 63 depend on opposite sides of the portion 61 of the canvas. Suitable ties or connections at 67 are provided to hold the flaps 62, 63 together below the pipe portion 41.

A pair of relatively short angle iron support braces are provided at each end and on the front and rear surfaces of the bottom 33 of cylinder 20, the angle iron braces being indicated as 70, 71 on the right end and one member being indicated at 72 on the left end of the cylinder, the one on the latter rear surface not being shown. Description will be limited to the braces 70, 71 since the braces at the opposite end are identical. The braces 70, 71 are welded, as at 73, 74, to the surface of the cylinder bottom 33 and have end plates 75, 76 generally in line with the end wall 22 of the container. Consequently, the angle iron braces open toward the longitudinal center of the liquid container.

Figure 3:
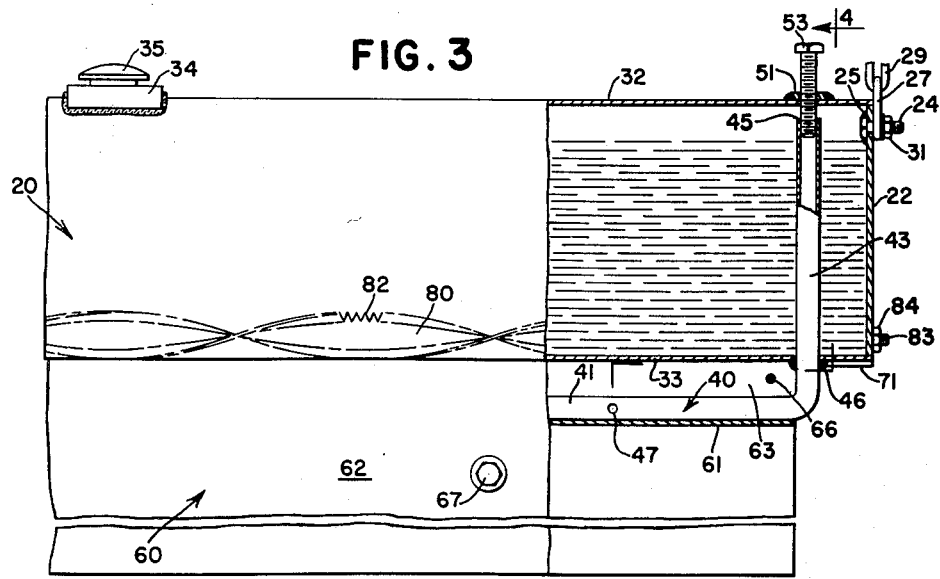
FIGURE 3 is an enlarged front view of one end of the applicator shown in FIGURE 1 with part thereof being a vertical sectional view as taken substantially along the lines 3—3 of FIGURE 2.

A pair of longitudinal currying elements 80, 81, parallel to the cylinder axis, are disposed front and rear of the canvas 60 and extend between the angle iron braces at the left and right ends of the cylinder. The currying elements 80, 81 are formed of elongated metal strips twisted to spiral shape and having serrations or teeth 82 on their edges (FIGURE 3). Viewing FIGURE 5 for purposes of showing the mounting of the currying element 80, a threaded stud 83 is welded to the surface of and projects beyond the end of the element 80 through the end plate 75 and has a nut 84 provided to fix the element in place relative to the angle iron brace 70. Similar arrangement is provided for each end of each of the currying elements 80, 81. Consequently, the currying elements may be replaced with more or less aggressive currying elements depending upon what degree of agressiveness is desired, or they may be removed entirely.

In operation, the cylinder 20 will normally be suspended at the height necessary to permit the cattle or livestock to contact the currying elements 80, 81 with their shoulders, back or buttocks. The animals will be attracted by both the currying elements 80, 81 and/or the soothing effect of the insecticide passing into the canvas 60. In this respect, it should be recognized that certain types of cattle, for example dairy cattle, will not desire the currying action, and consequently it is necessary to be able to remove the elements 80, 81 if required. In any respect, the animal will normally stand beneath the insecticide device and rub against some part of the insecticide device to cause the container to be thrashed around. Liquid within the container will splash into the open upper ends 44, 45 of the pipe 40 or will splash onto the threaded sections of the bolts 52, 53 above the ends 44, 45 where it will eventually flow around the threaded section of the valves or bolts 52, 53 and internally of the upper ends 44, 45 to find its way through the pipe 40 to be discharged at the ports 47 where it will permeate the canvas 60. Upon the animal moving from under the device, the drum or cylinder will again move to its horizontal position, whereby the level of the liquid will return to its normal position below the upper ends 44, 45 of the pipe to thereby shut off the flow of liquid.

It should here be pointed out relative to question of the desired level of liquid, that the present device is designed to substantially empty the container at all levels and also that the level of liquid will not materially affect the quantity or rate of discharge of fluid that will be discharged through the ports 47. This may be best explained by the fact that when the container is substantially full, the weight thereof will be such that the animal cannot vigorously move it. However, as the container approaches its being empty, the animal can then literally throw the container to the limits permitted by the chains 28, 29 to thereby cause a vigorous action of the fluid internally of the container. Consequently, the fluid, even though the tank or container be almost empty, will be splashed about the upper ends 44, 45 of the pipe. Also, fluid landing on the threaded surfaces of the bolt valves 52, 53 will tend to remain on those surfaces and will eventually pass into the pipe 40.

Referring now to the modification shown in FIGURES 7, 8, the purpose of the modification is to provide a better distribution of insecticide in the canvas 60 so the maximum will be applied to the animal. To fully appreciate the modification, it again must be recognized that different types of cattle prefer different types of currying action. For example, range cattle will after a winter have a very heavy coat and will in fact be attracted to the insecticide device principally for the currying action. One animal might stand for an hour beneath one end of the container rubbing itself on the currying elements. Using the first form of the invention as an example, if a cow stood adjacent one end of the device and raised that end to an incline shown in FIGURE 7, the fluid would normally flow down the right end 43 of the pipe 40 to be discharged through the ports 47 adjacent the right end of the bight portion 41. Consequently, the animal standing beneath the left end would receive little or no insecticide, which, of course, is not desirable. Also, insecticide would be eventually lost on the ground from the right end of the canvas 60 if the animal curried itself for a long period.

Therefore, in the modification shown in FIGURES 7, 8, there is provided a pair of L-shaped pipes 90, 91 with vertical leg portions 92, 93 extending through the bottom 33 of the cylinder 20 in the same manner as the previous form of the invention and similarly restricted at their upper ends by valves or bolts 52, 53. The pipes 90, 91 also have horizontally disposed leg portions 94, 95, parallel to one another and the axis of the cylinder, and welded at 96 to one another. Each of the horizontal portions 94, 95 extend well beyond the longitudinal center of the container and are closed at their ends 97, 98, except for single discharge ports or openings 99, 100 adjacent the ends 97, 98, respectively. Canvas 60 extends over the pipe portions 94, 95 much in the same manner as the previous form and details of the mounting of the canvas 60 on the pipe portions 94, 95 is not deemed necessary. Other details of the device may be similar to the previous form and the same reference numbers are applied where similar.

In the modification, should both ends of the container or cylinder 20 be moved substantially the same amount, there would be relatively even flow of fluid through both pipes 90, 91 and through discharge ports 99, 100. However, should an animal stand at one end of the container and raise that end, as for example to the incline shown in FIGURE 7, liquid would probably not reach the upper end of the pipe 92 and consequently very little fluid would move through the port 99. However, fluid would move through the pipe 91 since the level of the fluid, as indicated at 101, is above the upper end of the pipe portion 93 and would be discharged through the port 100. The port 100 would be above the animal and fluid passing through it would be applied to the back of the animal. Therefore, there would be a minimum of insecticide passed through the unit which would not be passed to the animal.

While only one modification has been shown, it should be recognized that other forms and modifications will occur to those skilled in the art without departing from the basic principles of the invention. Therefore, it should be understood that the present disclosure was shown and described in precise detail for purpose of fully and concisely illustrating the principles of the invention, and such was not intended to limit or narrow the invention beyond the broad concept set forth in the appended claims.

What is claimed is:

1. A device for applying liquid insecticide to an animal comprising: an elongated cylinder body closed at opposite ends by end plates to define a fluid container; a pair of end brackets fixed to the respective end plates and extending outwardly from the container and adapted for suspension by supporting elements whereby the container will normally be disposed horizontally to provide a bottom facing downwardly and a top facing upwardly and will be free to move in a plurality of directions; a one-piece U-shape pipe member having an elongated bight portion spaced below the container generally parallel to the axis of the container and extending substantially the length of the container, the bight portion having axially spaced fluid discharge openings therein, and a pair of upwardly projecting leg portions extending through the bottom adjacent the ends of the container and at least partially enclosed by the container with the upper ends thereof terminating spacedly but proximate the internal surface of the top of the cylinder, the upper ends being open to permit passage of fluid from the container into the pipe member; a pair of valve members adjustably mounted on and extending through the top of the cylinder for restricting the passage of fluid into the respective open ends of the pipe with means external of the container for adjusting the valve members; a fluid-permeable fabric enveloping the bight portion of the pipe receiving fluid through the fluid discharge openings and having oppositely disposed depending portions; and a pair of elongated currying elements running parallel to the cylinder axis and fixed to the container adjacent its bottom on opposite sides of the fabric.

2. A device for applying liquid insecticide to an animal comprising: an elongated cylinder body closed at opposite ends by end plates to define a fluid container; a pair of end brackets fixed to the respective end plates and extending outwardly from the container and adapted for suspension by supporting elements whereby the container will normally be disposed horizontally to provide a bottom facing downwardly and a top facing upwardly and will be free to move in a plurality of directions; a one piece U-shape pipe member having an elongated bight portion spaced below the container generally parallel to the axis of the container and extending substantially the length of the container, the bight portion having axially spaced fluid discharge openings therein, and a pair of upwardly projecting leg portions extending through the bottom adjacent the ends of the container and at least partially enclosed by the container with the upper ends thereof terminating spacedly but proximate the internal surface of the top of the cylinder, the upper ends being open to permit passage of fluid from the container into the pipe member; a pair of valve members adjustably mounted on and extending through the top of the cylinder for restricting the passage of fluid into the respective open ends of the pipe with means external of the container for adjusting the valve members; and a fluid-permeable fabric mounted on the bight portion of the pipe receiving fluid through the fluid discharge openings and having at least one depending portion for contact with the animal.

3. A device for applying liquid insecticide to an animal comprising: an elongated tubular body closed at opposite ends by end plates to define a fluid container; longitudinally spaced brackets fixed to the container and adapted for suspension by supporting elements whereby the container will normally be disposed horizontally to provide a bottom facing downwardly and a top facing upwardly and will be free to move in a plurality of directions; a one-piece U-shape pipe member having an elongated bight portion spacedly beneath the container and generally parallel to the container and extending substantially the length of the container, the bight portion having axially spaced fluid discharge openings therein, and a pair of upwardly projecting leg portions extending through the wall adjacent the ends of the container and at least partially enclosed by the container with the upper ends thereof terminating spacedly but proximate the internal surface of the top of the container, the upper ends being open to permit passage of fluid from the container into the pipe member; a pair of valve members adjustably mounted on and extending through the top of the container for restricting the passage of fluid into the respective open ends of the pipe with means external of the container for adjusting the valve members; and a fluid-permeable fabric supported on the container for receiving fluid through the fluid discharge openings and having at least one depending portion for contact with the animal.

4. A device for applying liquid insecticide to an animal comprising: an elongated tubular body closed at opposite ends to define a fluid container; longitudinally spaced brackets fixed to the container and adapted for suspension by supporting elements whereby the container will normally be disposed horizontally to provide a bottom facing downwardly and a top facing upwardly and will be free to move in a plurality of directions; a U-shaped pipe member having an elongated bight portion beneath and spaced from the bottom of the container and extending substantially the length thereof and having spaced fluid discharge openings therein, and a pair of upwardly projecting portions fixed to and extending through the bottom of the container to be at least partially enclosed by the container with the upper end thereof terminating spacedly but proximate the internal surface of the top of the container, the upper ends thereof being open to permit passage of fluid from the container into the pipe member; means internally of and rigidly joined to the container engaging the upper ends of the upwardly projecting portions; and a fluid-permeable fabric supported on the container for receiving fluid through the fluid discharge openings and having at least one depending portion for contact with the animal.

5. A device for applying liquid insecticide to an animal comprising: a fluid container; means supporting the container whereby the container will have a bottom facing downwardly and a top facing upwardly and will be free to move in a plurality of directions; a fluid conduit including an elongated horizontally disposed portion spaced from but adjacent the bottom of the container and extending substantially the length thereof and having fluid discharge means therein, and at least one upwardly projecting portion fixed to and extending through the container wall with an upper open end thereof terminating spacedly but proximate the internal surface of the top of the container; a threaded member extending through the top of the container into engagement with the open end of the pipe for restricting the passage of fluid into the open end and engaging the end of the pipe to afford support thereof from the top of the fluid container; a fluid transferring medium supported adjacent the horizontally disposed portion for receiving fluid through the fluid discharge means and having a depending portion thereof for contacting the upper body portion of an animal.

6. The invention defined in claim 3, in which the container is in the form of a cylindrical member and the flexible elements are connected to the cylindrical member by upwardly extending rigid bracket structure defining pivotal connecting means above the top of the cylinder.

7. The invention defined in claim 3, in which the fluid transferring medium is in the form of a fluid-permeable material draped over the horizontally disposed portion of the fluid conduit means and depending downwardly therefrom.

8. The invention defined in claim 3, further characterized by said valve members being in the form of bolts threadedly supported on the respective wall with the threaded ends of the bolts extending into the open ends and the head ends being disposed outwardly of the container.

9. The invention defined in claim 1, further characterized by each currying element being in the form of a spiral shaped metal strip having serrated edges.

10. A device for applying liquid insecticide to an animal comprising: an elongated tubular body closed at opposite ends to define a fluid container; suspension means for the container whereby the container will normally be disposed horizontally to provide a bottom facing downwardly and a top facing upwardly and will be free to move in a plurality of directions; a U-shaped pipe means composed of a pair of L-shaped pipe members having elongated horizontal leg portions defining the bight portion of said U-shaped pipe means and disposed beneath, spaced from, and generally parallel to the bottom of the container with each thereof extending substantially the length of the container and having spaced fluid discharge openings therein, said L-shaped members further having upwardly projecting leg portions fixed to and extending through the bottom of the container adjacent the respective ends of the container to be at least partially enclosed by the container with the upper ends thereof terminating spacedly but proximate the internal surface of the top of the container, the upper ends thereof being open to permit passage of fluid from the container into the pipe member; valve means internally of the container and connected to the container wall for adjusting the rate of flow of fluid in each of the L-shaped pipe members; and a fluid-permeable fabric supported on the container for receiving fluid through the fluid discharge openings and having at least one depending portion for contact with the animal.

11. The invention defined in claim 2 in which the one-piece U-shape pipe member is composed of two L-shaped pipes with one leg of each L-shaped pipe being disposed alongside a leg of the other and being rigidly fixed to that leg, said legs thereby defining the bight portion of the U-shape pipe member, the other legs of each L-shaped pipe being the aforesaid upwardly projecting leg portions.

12. The invention defined in claim 11 further characterized by the legs defining the bight extending substantially the length of the container with each of the latter legs having fluid discharge opening throughout its length.

References Cited in the file of this patent
UNITED STATES PATENTS

| | | |
|---|---|---|
| 987,433 | Crawford | Mar. 21, 1911 |
| 1,269,725 | May | June 18, 1918 |
| 2,133,899 | Mansfield | Oct. 18, 1939 |
| 2,702,020 | Worden | Feb. 15, 1955 |